United States Patent
LaFlamme et al.

(10) Patent No.: US 8,292,120 B2
(45) Date of Patent: Oct. 23, 2012

(54) HANGING LIQUID DISPENSER

(75) Inventors: Roger J. LaFlamme, Enfield, CT (US); Robert J. Mileti, Torrington, CT (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 728 days.

(21) Appl. No.: 12/053,700

(22) Filed: Mar. 24, 2008

(65) Prior Publication Data

US 2008/0237262 A1    Oct. 2, 2008

Related U.S. Application Data

(60) Provisional application No. 60/908,030, filed on Mar. 26, 2007.

(51) Int. Cl.
*B65D 35/54* (2006.01)
(52) U.S. Cl. .......... 222/94; 222/105; 222/135; 222/207; 417/480
(58) Field of Classification Search .............. 417/480; 222/92–96, 105–107, 135, 181.2, 206–215, 222/380, 494, 633
See application file for complete search history.

(56) References Cited

U.S. PATENT DOCUMENTS

| | | |
|---|---|---|
| 886,984 A | 5/1908 | Jopling |
| 1,217,054 A | 2/1917 | Pearman |
| 1,941,745 A | 1/1934 | Higley |
| 2,589,743 A * | 3/1952 | Snaith .......................... 222/94 |
| 2,714,475 A | 8/1955 | Roehrich |
| 2,855,127 A | 10/1958 | Lerner et al. |
| 3,223,289 A | 12/1965 | Bouet |
| 3,396,419 A | 8/1968 | Richter et al. |
| 3,617,139 A | 11/1971 | Ross |
| 3,949,137 A | 4/1976 | Akrongold et al. |
| 3,981,106 A | 9/1976 | Gallo |
| 4,004,854 A | 1/1977 | Breer, II |
| 4,074,944 A | 2/1978 | Xavier |
| 4,098,434 A | 7/1978 | Uhlig |
| 4,124,316 A | 11/1978 | O'Rourke |
| 4,127,515 A | 11/1978 | MacRae et al. |
| 4,188,989 A | 2/1980 | Andersen |

(Continued)

FOREIGN PATENT DOCUMENTS

DE        4030851        4/1992

(Continued)

OTHER PUBLICATIONS

Stephen & Lawyer, Inc., Reticulated Foam, http://www.steplaw.com/reticulatedfoam.html.

(Continued)

*Primary Examiner* — Kevin P Shaver
*Assistant Examiner* — Andrew P Bainbridge
(74) *Attorney, Agent, or Firm* — St. Onge Steward Johnston & Reens, LLC

(57) ABSTRACT

A hanging liquid dispenser is provided that includes a pump and valving for delivering the fluid material when the dispenser is operated by the user in a controlled fashion. The hanging dispenser includes a main body that serves as a fluid reservoir and has an eyelet which is suitable for use in hanging the dispenser from a suitable support. In addition to including the ability to hang, the dispenser preferably includes a pump for metered dosing of the fluid within the dispenser when operation of the pump delivers a controlled volume of the fluid as desired by the user.

22 Claims, 7 Drawing Sheets

U.S. PATENT DOCUMENTS

| | | | |
|---|---|---|---|
| 4,463,876 A * | 8/1984 | Swallert | 222/94 |
| 4,560,375 A * | 12/1985 | Schulte et al. | 604/9 |
| 4,564,127 A * | 1/1986 | Garabedian et al. | 222/96 |
| 4,702,397 A | 10/1987 | Gortz | |
| 4,728,006 A * | 3/1988 | Drobish et al. | 222/181.3 |
| 4,753,006 A | 6/1988 | Howe | |
| 4,760,642 A | 8/1988 | Kwak | |
| 4,809,432 A | 3/1989 | Schauble | |
| 4,886,388 A | 12/1989 | Gulker et al. | |
| 4,888,868 A | 12/1989 | Pritchard | |
| 4,889,441 A | 12/1989 | Tice | |
| 4,890,744 A | 1/1990 | Lane, Jr. et al. | |
| 4,993,594 A | 2/1991 | Becker et al. | |
| 5,014,427 A | 5/1991 | Byrne | |
| 5,016,351 A | 5/1991 | Drahus | |
| 5,067,635 A * | 11/1991 | Thomsen | 222/103 |
| 5,074,765 A | 12/1991 | Pekar | |
| 5,114,255 A | 5/1992 | Villarreal | |
| 5,168,628 A | 12/1992 | Mock et al. | |
| 5,176,510 A | 1/1993 | Nilsson | |
| 5,207,355 A * | 5/1993 | Thomsen | 222/95 |
| 5,261,570 A | 11/1993 | Hippely et al. | |
| 5,265,772 A | 11/1993 | Bartasevich et al. | |
| 5,303,851 A | 4/1994 | Libit et al. | |
| 5,337,478 A | 8/1994 | Cohen et al. | |
| 5,353,961 A | 10/1994 | Debush | |
| 5,356,039 A | 10/1994 | Christine et al. | |
| 5,372,487 A | 12/1994 | Pekar | |
| 5,387,207 A | 2/1995 | Dyer et al. | |
| 5,388,728 A * | 2/1995 | Gueret | 222/105 |
| 5,441,345 A | 8/1995 | Garvey et al. | |
| 5,482,980 A | 1/1996 | Pcolinsky | |
| 5,505,341 A | 4/1996 | Gueret | |
| 5,555,673 A | 9/1996 | Smith | |
| 5,564,190 A | 10/1996 | Fleetwood | |
| 5,640,737 A | 6/1997 | Boggs | |
| 5,700,245 A | 12/1997 | Sancoff et al. | |
| 5,701,674 A | 12/1997 | Mitchell | |
| 5,704,723 A | 1/1998 | Salisian | |
| 5,761,813 A | 6/1998 | Frick et al. | |
| 5,836,482 A | 11/1998 | Ophardt et al. | |
| 5,842,607 A | 12/1998 | Snider | |
| 5,855,066 A | 1/1999 | Manager | |
| 5,865,554 A | 2/1999 | Lin | |
| 5,934,296 A | 8/1999 | Clay | |
| 5,944,032 A | 8/1999 | Masterson | |
| 5,950,928 A | 9/1999 | Giang et al. | |
| 5,983,500 A | 11/1999 | da Silva | |
| 6,183,154 B1 | 2/2001 | Coe | |
| 6,210,064 B1 | 4/2001 | White et al. | |
| 6,251,098 B1 | 6/2001 | Rake et al. | |
| 6,302,607 B1 | 10/2001 | Burrowes et al. | |
| 6,394,316 B1 | 5/2002 | Daansen | |
| 6,406,207 B1 | 6/2002 | Wiegner et al. | |
| 6,419,118 B1 | 7/2002 | Rees et al. | |
| 6,558,629 B1 | 5/2003 | Davidson | |
| 6,623,201 B2 | 9/2003 | Brumlik | |
| 6,629,799 B2 | 10/2003 | Flores, Jr. | |
| 6,641,307 B2 | 11/2003 | Matsuda et al. | |
| 6,715,952 B1 | 4/2004 | Aiken et al. | |
| 6,754,958 B2 | 6/2004 | Haws et al. | |
| 6,789,321 B2 | 9/2004 | Simms | |
| 6,789,706 B2 * | 9/2004 | Abergel et al. | 222/207 |
| 6,843,368 B1 | 1/2005 | Frutin | |
| 6,868,987 B2 * | 3/2005 | Hedington et al. | 222/95 |
| 6,883,563 B2 | 4/2005 | Smith | |
| 6,886,254 B1 | 5/2005 | Pennella | |
| 6,910,274 B1 | 6/2005 | Pennella et al. | |
| 6,925,716 B2 | 8/2005 | Bressler et al. | |
| 6,929,155 B1 | 8/2005 | Sayers | |
| 6,964,097 B2 | 11/2005 | Franzini et al. | |
| 6,996,908 B2 | 2/2006 | Orloff et al. | |
| 7,043,841 B2 | 5/2006 | Franzini et al. | |
| 7,121,754 B2 | 10/2006 | Bressler et al. | |
| 7,137,203 B2 | 11/2006 | Bressler et al. | |
| 7,137,531 B2 | 11/2006 | Arghyris et al. | |
| 7,156,132 B2 | 1/2007 | O'Dougherty et al. | |
| 7,159,742 B2 | 1/2007 | Lee | |
| 2001/0025859 A1 | 10/2001 | Dumont | |
| 2001/0025860 A1 | 10/2001 | Auer | |
| 2002/0085873 A1 | 7/2002 | Katsandres et al. | |
| 2003/0077106 A1 | 4/2003 | Weihrauch | |
| 2003/0121936 A1 | 7/2003 | De Laforcade | |
| 2004/0092864 A1 | 5/2004 | Boehm, Jr. et al. | |
| 2004/0140326 A1 | 7/2004 | Smart et al. | |
| 2004/0177510 A1 | 9/2004 | Pennella | |
| 2004/0178284 A1 | 9/2004 | Fahy et al. | |
| 2004/0206776 A1 * | 10/2004 | Awbrey et al. | 222/105 |
| 2005/0138814 A1 | 6/2005 | Pennella et al. | |
| 2005/0144785 A1 | 7/2005 | Bressler et al. | |
| 2005/0199651 A1 * | 9/2005 | Laflamme et al. | 222/107 |
| 2006/0072858 A1 | 4/2006 | Kurosawa et al. | |
| 2006/0150386 A1 | 7/2006 | Wanli et al. | |
| 2006/0254056 A1 | 11/2006 | Coffin et al. | |
| 2006/0255068 A1 | 11/2006 | Genosar | |
| 2006/0272154 A1 | 12/2006 | Brevard | |
| 2007/0017098 A1 | 1/2007 | Bressler et al. | |
| 2007/0084058 A1 | 4/2007 | Szczepanowski et al. | |
| 2007/0214646 A1 | 9/2007 | Bezdek | |

FOREIGN PATENT DOCUMENTS

| | | |
|---|---|---|
| DE | 29719331 | 12/1997 |
| DE | 29818058 | 1/1999 |
| FR | 2628394 A1 | 9/1989 |
| FR | 2683759 | 11/1991 |
| GB | 2083142 A | 3/1982 |
| JP | 6293348 | 10/1994 |
| JP | 10165668 | 6/1998 |
| JP | 2005199020 | 7/2005 |
| WO | 0176972 A1 | 10/2001 |
| WO | 0176974 A1 | 10/2001 |
| WO | 02071907 A1 | 9/2002 |
| WO | 2004096504 | 11/2004 |
| WO | 2005086852 A2 | 9/2005 |

OTHER PUBLICATIONS

3M Worldwide, Scotch-Brite Urethane Laminate 325HK 5 Pieces/Pack 72 Packs/Case, http://products3.3m.com/catalog/hk/en009/home_leisure/-/node_H16XQM6PDVgs/root_B . . . .

Plastic Bags for You, Pouch (zipper & non zipper), flat pouch, stand up pouch, with and without valve, with and without window, plain & reprinted, paper bag, etc., http://plasticbagsforyou.com/PRODUCTS/pouch-group.html.

* cited by examiner

HANGING LIQUID DISPENSER

CROSS-REFERENCE TO RELATED APPLICATIONS

This application is related to and claims priority from earlier filed U.S. Provisional Patent Application No. 60/908,030 filed Mar. 26, 2007.

BACKGROUND OF THE INVENTION

This invention relates generally to product packages that include integrated dispensing devices. More specifically, the present invention relates to a hanging product package that contains a fluid media therein and includes a metering dispensing device that can controllably dispense the fluid media from the product package containing the fluid media.

Various types of fluid material and media are employed for different purposes throughout commerce and industry. For example, there are various products in the areas of personal care, home care, air care, transportation care and food industries that require a fluid material to be dispensed in some manner from a source of such material. Further, when this material is sold in commerce, it must be contained and stored in some type of container while awaiting use. Ultimately, when that product is used, it must be dispensed from its storage container to the desired location for use.

In the prior art, there are many different types of dispensers that are employed for the delivery of a stored fluid material to their desired location for use. For example, a storage container having a flexible body with a nozzle tip extending therefrom is commonly provided for such a purpose. An example of such use can be seen in the context of a ketchup dispenser, where a user squeezes the container body to urge the fluid material (ketchup) out from container body and through the nozzle tip to accurately deposit the fluid material at the desired location. In such an application, the amount of fluid that is ultimately delivered is determined by the how much the user actually squeezes the container body. While this method has provided marginally acceptable results, this method also typically yields an erratic fluid volume since more or less fluid material may be delivered on each successive squeeze of the container body. Also, the container must be held upright to avoid leakage because no valves are employed in the fluid nozzle tip.

In another example of a prior art dispensing device, a flexible container is provided that holds a volume of fluid material to be delivered. In an attempt to overcome the leakage issue noted above, a single one-way check valve is provided at the exit port of the flexible container. When the flexible body is squeezed, the material is urged out under pressure through the valve. The difficulty here is that the valve over time becomes partially clogged thereby requiring that the user apply additional pressure to cause the valve to open. As a result, once the valve opens, the additional pressure causes more fluid material to be deposited than the user typically would have desired.

In addition to the above noted need for simply dispensing a volume of fluid material, there is also a desire for the ability to hang the fluid dispenser in a convenient location so that it can be easily accessible at all times. Further, since the device is hanging, the fluid all travels to the dispenser end of the reservoir so that it is in a position that makes the dispenser always ready for use. None of the prior art dispensers provide a packaging structure that can be hung for convenient use while also including a metered dispensing system.

Therefore, there is a need for a fluid dispenser that is easy to operate. There is a further need for a fluid dispenser that is capable of delivering a metered dose of fluid with each dispensing operation in order to produce predictable flow and a better application of the fluid material. There is also a need for such a dispenser that can operate independent of gravity wherein the dispenser can be hung from a supporting structure thereby making its use convenient and easy. Many of these needs are met by commonly owned, co-pending U.S. patent application Ser. No. 11/074,817, filed on Mar. 8, 2005 and U.S. patent application Ser. No. 11/951,351, filed on Dec. 6, 2007, which are incorporated herein by reference. This application sets forth a hanging device for dispensing liquids in a metered fashion wherein the device is attractive thereby allowing it to remain hanging at all times from, a hook for example.

BRIEF SUMMARY OF THE INVENTION

In this regard, the present invention preserves the advantages of prior art dispensing devices. In addition, the present invention provides new advantages not found in currently available devices and overcomes many disadvantages of such currently available devices. The present invention is generally directed to a novel and unique hanging fluid dispenser that has particular application in being positioned in a convenient location for easy access and operation by the user. The present invention, if desired, can easily incorporate any type of pump or valve presently available for liquid dispensers in connection with delivering fluid material at the appropriate time, such as when the dispenser is operated by the user in a controlled fashion.

Generally, the hanging dispenser of the present invention includes a main body that includes a chamber, which serves as a fluid reservoir for storing the liquid to be dispensed. Typically, this reservoir is formed using two sheets of material, such as plastic that is welded in the appropriate places to form the desired shape and to form a liquid tight assembly. A fluid reservoir of any shape can be used. The liquid is stored in the space created between the two sheets of sealed material. In addition, an aperture is cut in the sheets of material with the appropriate welding thereabout to seal the aperture in a manner that prevents leakage of the fluid contained within the fluid reservoir. As a result, this construction forms a built in eyelet in the packaging. This eyelet is suitable for use in supporting the dispenser of the present invention by routing it over any type of structure, such as a hook or other support. Thus, the main body of the packaging can be easily hung on the desired support by a user immediately and without requiring any modification of the packaging.

It should be noted that any type and size of aperture could be provided in the packaging to effectuate the hanging functionality of the dispenser. In fact, any type of hanger, eye or hook can be incorporated into the package to carry out the ability for the packaging to be easily hung to a support. For example, the hanger structure can be a rope, suction cup, Velcro strap, and the like. The container can be used, for example, to contain shampoo, lotions, soap, laundry detergent, and the like.

In addition to including the ability to hang, the dispenser of the present invention also preferably includes a pump for metered dosing of the fluid within the dispenser. A pump for a fluid dispensing device includes flexible metering housing is disposed in fluid communication with the fluid storage region. A first one-way flapper valve disposed between the container and the flexible metering housing. One way flow from the interior fluid storage region of the container fills the predetermined volume of the metering chamber with fluid by vacuum action when the flexible metering housing is depressed and then released. A second valve is in fluid communication with the metering housing output port and permits one-way fluid flow from the metering chamber to the exterior outer region of the container at the exit port or nozzle when the metering housing is depressed again. Each time the metering housing is depressed a substantially equal volume of fluid is dispensed from the container. It can be understood that the metering pump mechanism can be attached to any chamber or reservoir that contains a liquid or fluid material for leak-free dispensing thereof. As can be understood, in the dispenser configuration of the present invention, the user can squeeze the pump with one hand while the other hand is positioned underneath the exit port or nozzle to receive the fluid. This "hands-free" dispensing is particularly useful in certain environments where it is desired to have quick access to the liquid delivery.

It is therefore an object of the present invention to provide hanging fluid dispensing device that can deliver a controlled, metered volume of fluid material with each dispensing operation. It is also an object of the present invention to provide such a fluid dispensing device that is insensitive to gravity.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
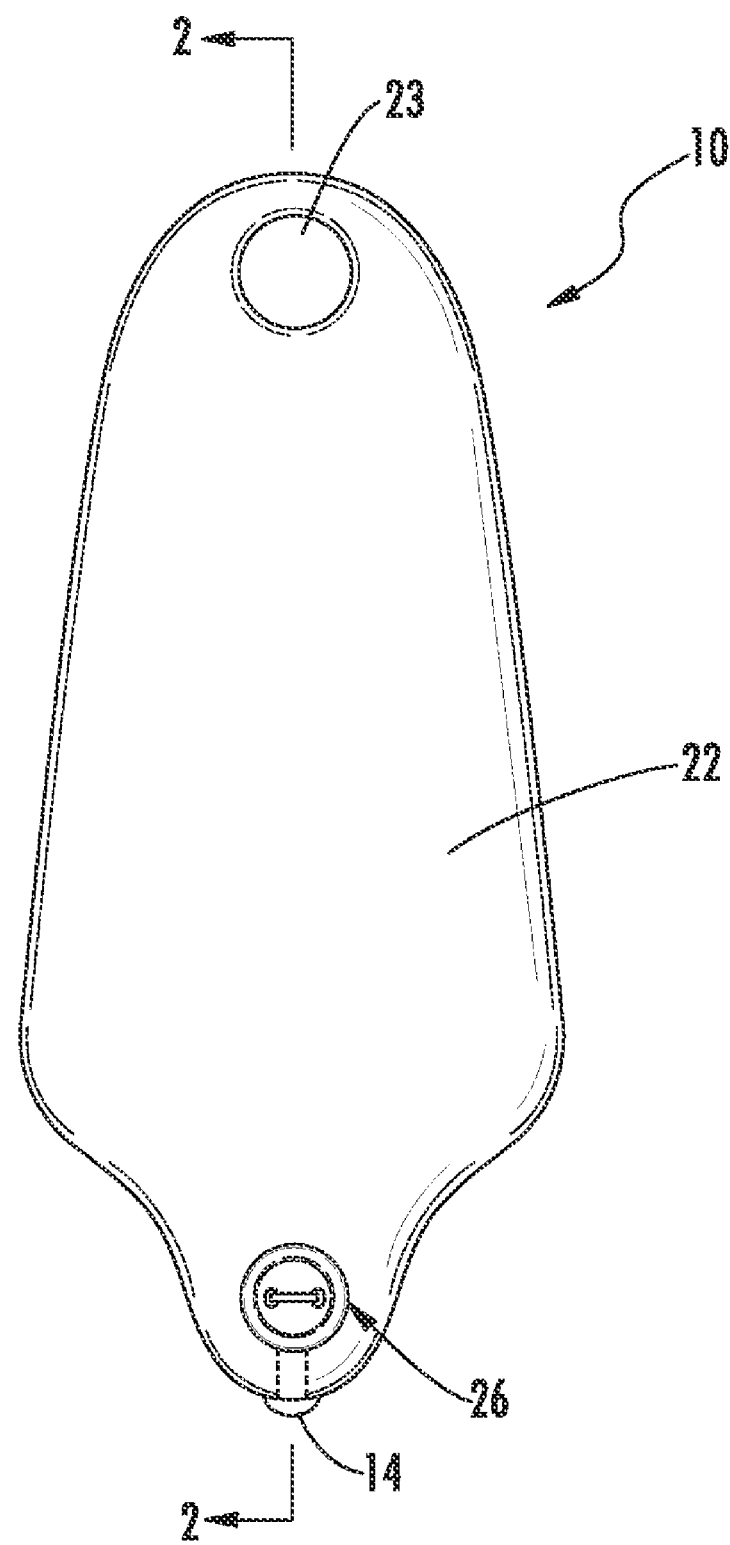
FIG. 1 is a front view of a hanging dispensing device of the present invention.
Figure 2:
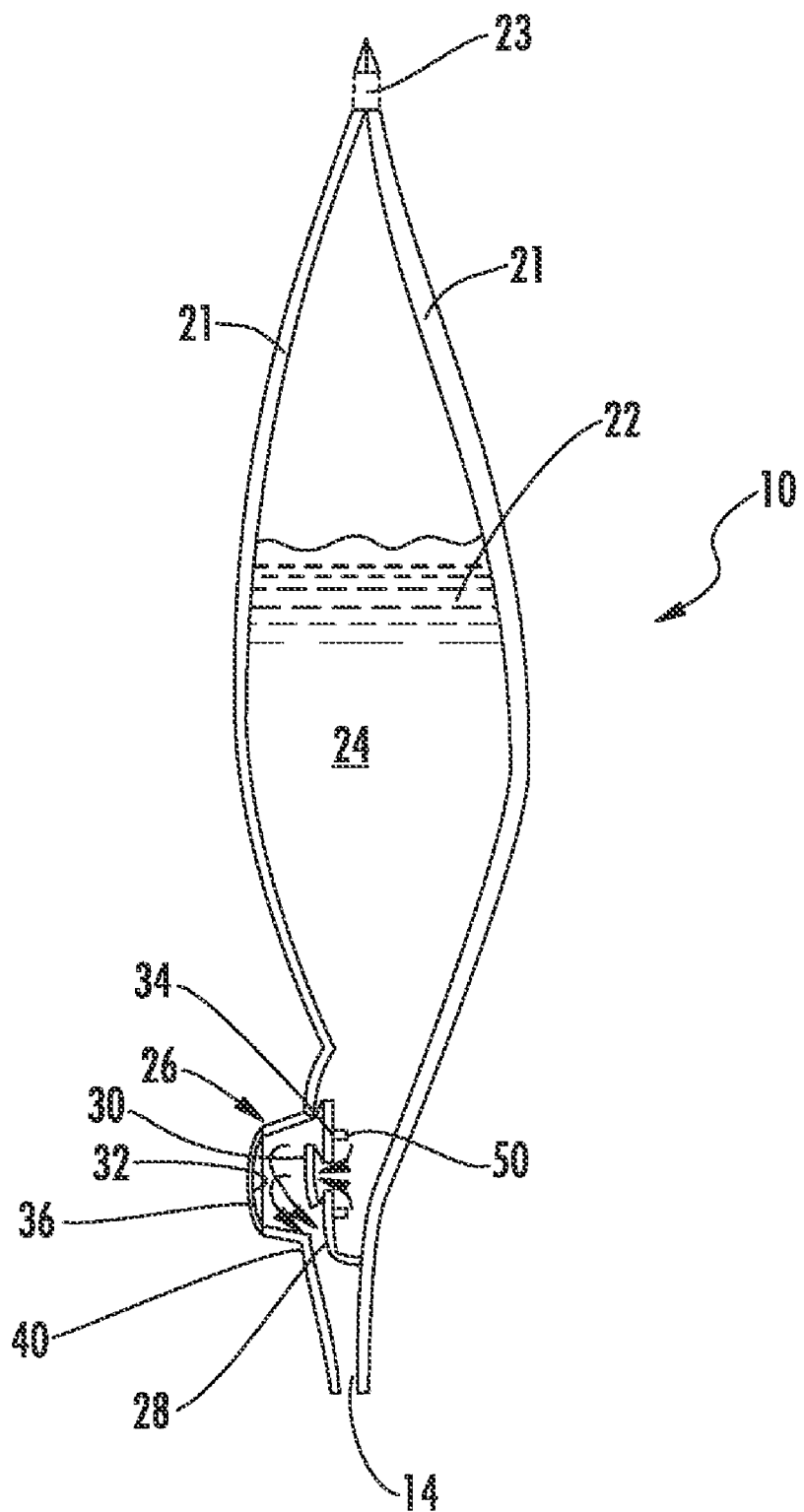
FIG. 2 is a cross-sectional view of the dispensing device of the present invention taken along line 2-2 of FIG. 1.
Figure 3:
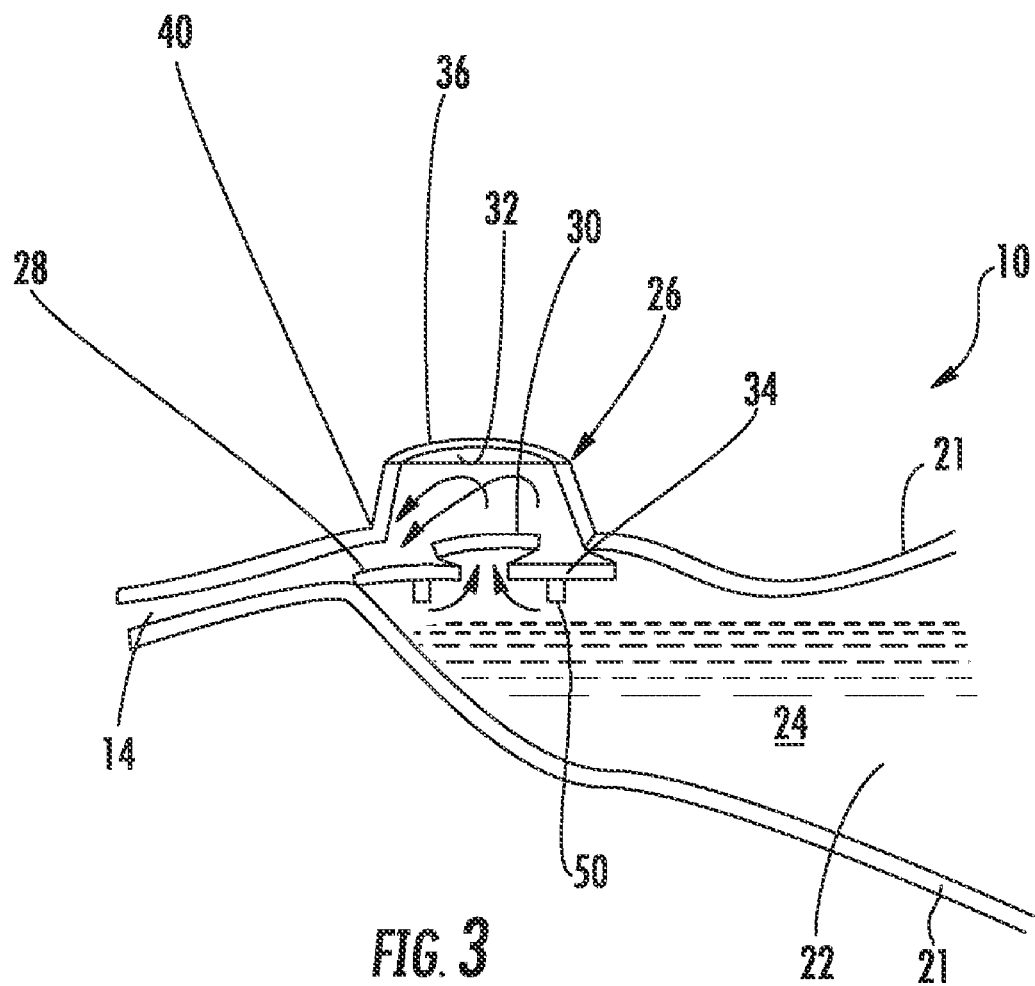
FIG. 3 is a cross-sectional view of the preferred metered dosing pump used in connection with the present invention.

Now referring to the drawings, the dispensing device of the present invention is shown and generally illustrated at 10 in FIGS. 1-3. As can be seen, the hanging dispensing device 10 of the present invention includes a fluid reservoir 22 configured and arranged to contain a fluid 24 for dispensing. Typically, the fluid reservoir 22 is formed using two sheets of material 21, such as plastic that is welded in the appropriate places to form the desired shape and to form a liquid tight assembly. A fluid reservoir 22 of any shape can be used. The fluid 24 is stored in the space created between the two sheets 21 of sealed material. In addition, an aperture 23 is cut in the sheets of material 21 with the appropriate welding thereabout to seal the aperture 23 in a manner that prevents leakage of the fluid 24 contained within the fluid reservoir 22. As a result, this construction forms a built in eyelet 23 in the packaging. This eyelet 23 is suitable for use in supporting the dispenser 10 of the present invention by routing it over any type of structure, such as a hook or other support. Thus, the dispenser 10 can be easily hung on the desired support by a user immediately and without requiring any modification of the packaging.

While any pump or valve arrangement suitable for use in such a context is suitable in connection with the present invention, preferably a metered dosing pump is employed that serves to dispense a controlled and known volume of fluid with each operation thereof. Accordingly, a metered dosing pump 26 is provided in fluid communication with the fluid reservoir 22 and is operable to transfer a portion of the fluid 24 from the fluid reservoir 22 to an output port 14. It should be appreciated that generally, while the dispensing device 10 of the present invention is depicted as having one fluid reservoir 22, as will be discussed in more detail below, it is within the scope of the present invention that the device include a plurality of fluid reservoirs as needed by any given application.

Turning now to FIGS. 1-3 in detail, the fluid reservoir 22 can be seen to have two outer walls 21 that cooperate to form an interior cavity that serves as the fluid reservoir 22 and contains a fluid 24 therein. A metered dosing pump 26 is positioned in the fluid reservoir 22 and is in fluid communication with the fluid 24 contained therein. The output 28 of the metered dosing pump 26 in this embodiment is arranged to deposit the fluid via the output port 14.

FIGS. 2 and 3 in particular depict a cross-sectional view through the metering pump 26 along the line 2-2 of FIG. 1, where FIG. 3 is a close in view shown to illustrate the internal construction of the metering pump 26 used in connection with the fluid dispenser 10 of the present invention. It should be appreciated that the metering pump 26 may vary in size, profile, operational pressure, recess, etc. while including the same structural elements. As was stated above, the fluid reservoir 22 is provided to include a fluid storage region that contains a volume of fluid material 24 therein. The outer walls of the fluid reservoir 22 are preferably made of a flexible material, such as plastic or nylon. Thus, as the fluid material 24 is evacuated from within the fluid reservoir 22 it will collapse gradually for a compact structure.

A metering housing is provided in the metering pump 26. The metering housing includes an intake one-way valve 30, such as a check valve, to pull fluid 24 from the fluid storage region 22 into a metering chamber 32 of a predetermined size. Any type of valve can be used to suit the given application. The intake valve 30 is positioned in a base plate 34 of the metering housing. Thus, during intentional operation, fluid 24 can only flow in one way from the fluid storage region 22 into the metering chamber 32 although it is possible that the valve allow two way travel of fluid for a portion of the stroke to prevent accidental dispensing. The metering chamber 32 is defined by a flexible membrane 36 in the form of a button or bulb that is accessible and manipulateable such that the user can depress the flexible membrane 36. The button 36 is preferably clear to provide an indicator to the consumer when the metered dosage of fluid material 24 is ready for delivery. An output valve 40 is provided in fluid communication with the metering chamber 32 of the metering housing. Thus, the fluid residing in the metering chamber 32 can only exit through the output valve 40 into the outlet 14 that serves to direct the exit of the fluid 24.

In accordance with the present invention, each press of the flexible membrane 36 causes a metered amount of fluid 24 to be forced into the mixing chamber 14. It should be appreciated that the button/membrane 36 can be placed anywhere on the device 10, as needed. Still referring to FIG. 3, the operation of the metered dosing pump is further explained. The button 36 of the metering housing is depressed to initiate a vacuum operation. More specifically, when the button 36 is further released, fluid is pulled from the fluid reservoir 22 into the metering chamber 32 which is configured to be of a certain known volume. The act of releasing the button 36 fills the metering chamber 32 to substantial capacity. Thus, a metered amount of fluid material 24 is contained within the metering chamber 32 in preparation for delivery. The size of the metering chamber 32 can be selected according to the type of fluid material 24 to be dispensed, the application therefor and the desired dosage volume. A further depression of the button 36 urges the measured volume of fluid 24 within the metering chamber 32 to exit out through the output port 28 of the metering housing. This known amount of fluid material 24 is then routed into the output port 14.

It can also be seen in FIG. 3 that a number of standoff legs 50 emanate downwardly from the base plate 34 of the metering housing. These legs 50 prevent the base plate 34 from completely bottoming out against the fluid reservoir 22 wall thereby blocking flow of fluid material 24 into the intake valve 30. The standoff legs 50 are particularly useful when the volume of fluid material 24 left in the fluid reservoir 22 is running low and the fluid reservoir 22 is becoming relative flat in configuration. In this situation, there is a possibility that the aforesaid bottoming out may occur. However, the use of the standoff legs 50 prevents this from occurring. It should also be appreciated that while standoff legs 50 are shown, other spring biased or spring like structures may be used to accomplish the same function and should be considered interchangeable with the standoff legs 50.

Figure 4:
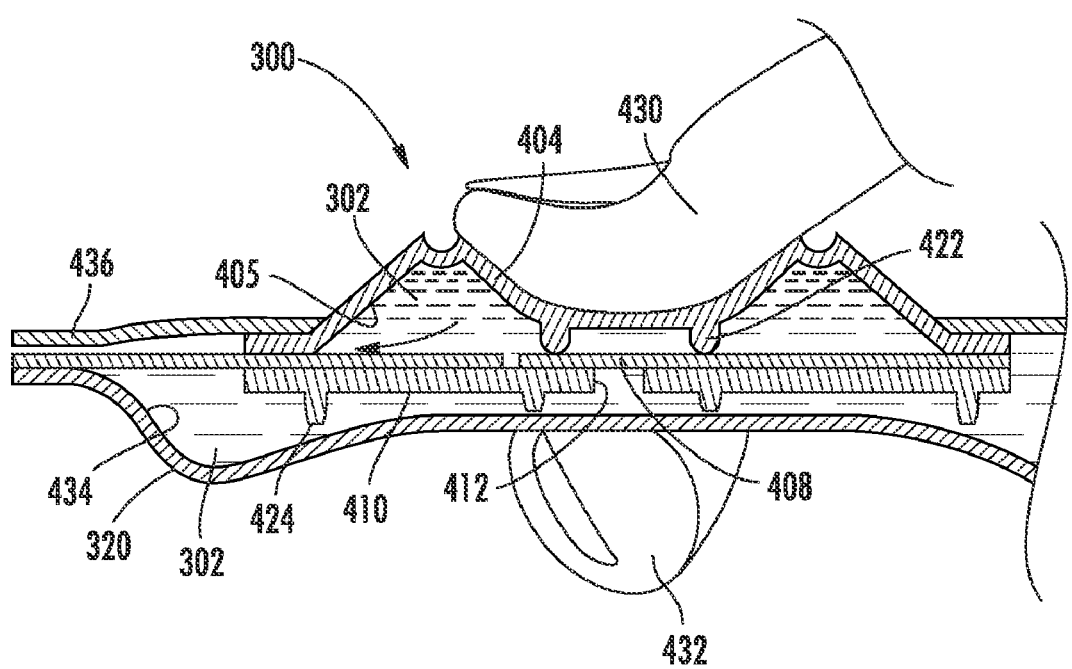
FIG. 4 is a cross sectional view of an alternate embodiment dispensing pump of the invention.

Turning now to FIG. 4, details are shown of an alternate metering pump 300 that includes the improved valving of the present invention that prevents inadvertent or accidental dispensing of fluid 24 even when pressure is placed on the pump 300 or fluid reservoir 22. In this embodiment of the pump 300 of the present invention, the base plate 410, through which the flow through aperture 412 passes, is preferably slightly convex, although it may be flat, if desired. Resting above the aperture 412 and within the cavity 405 of the dome is a flapper valve 408 of preferably thin film construction. It is possible that this flapper valve 408 be configured of a normally open condition but also may be configured to lie flat when at rest. As long as the plate 410 with the aperture remains convex, the flapper valve 408 does not seal against the aperture 412 such that any inadvertent contact with the flexible dome pump housing 404 does not result in the dispensing of the product. Instead, since the flapper valve 408 is open, liquid product residing inside the cavity 405 of the flexible pump housing 404 will tend to simply flow back through the inlet aperture 412 to the reservoir within the storage container itself, as indicated by the arrow, rather than flow undesirably out through the exit valve to outside of the pump 300. In use, if a person has the fluid dispenser in their pocket or purse and pressure is accidentally or unintentionally placed on the flexible housing 404 of the pump 300, liquid will not flow outside the dispenser thereby preventing a mess from being made due to unintentionally dispensed product.

FIG. 4 illustrates intentional dispensing of fluid 24. When it is desired to actually dispense the liquid product 24, the user's thumb 430 can depress the flexible dome 404 and the user's index finger 432 can invert the base plate 410 from convex to concave, by application of force against the standoff legs 424, such that flexible dome 404, with the assistance of the stand-off legs 422 under the flexible dome, securely seals and provides a positive lock of the flapper valve 408 over and about the aperture 412 thereby closing the liquid flow passage back into the reservoir 434 of the second fluid reservoir 320. It is also possible that the base plate 410 is concave and then is inverted to a convex configuration. Other fingers of the user may be used to carry out this operation. Thus, the only path for the liquid 302 contained within the cavity 405 of dome 404 is to exit through the one-way outlet valve 436 for intended dispensing of the product, as indicated by the arrows.

Figure 5:
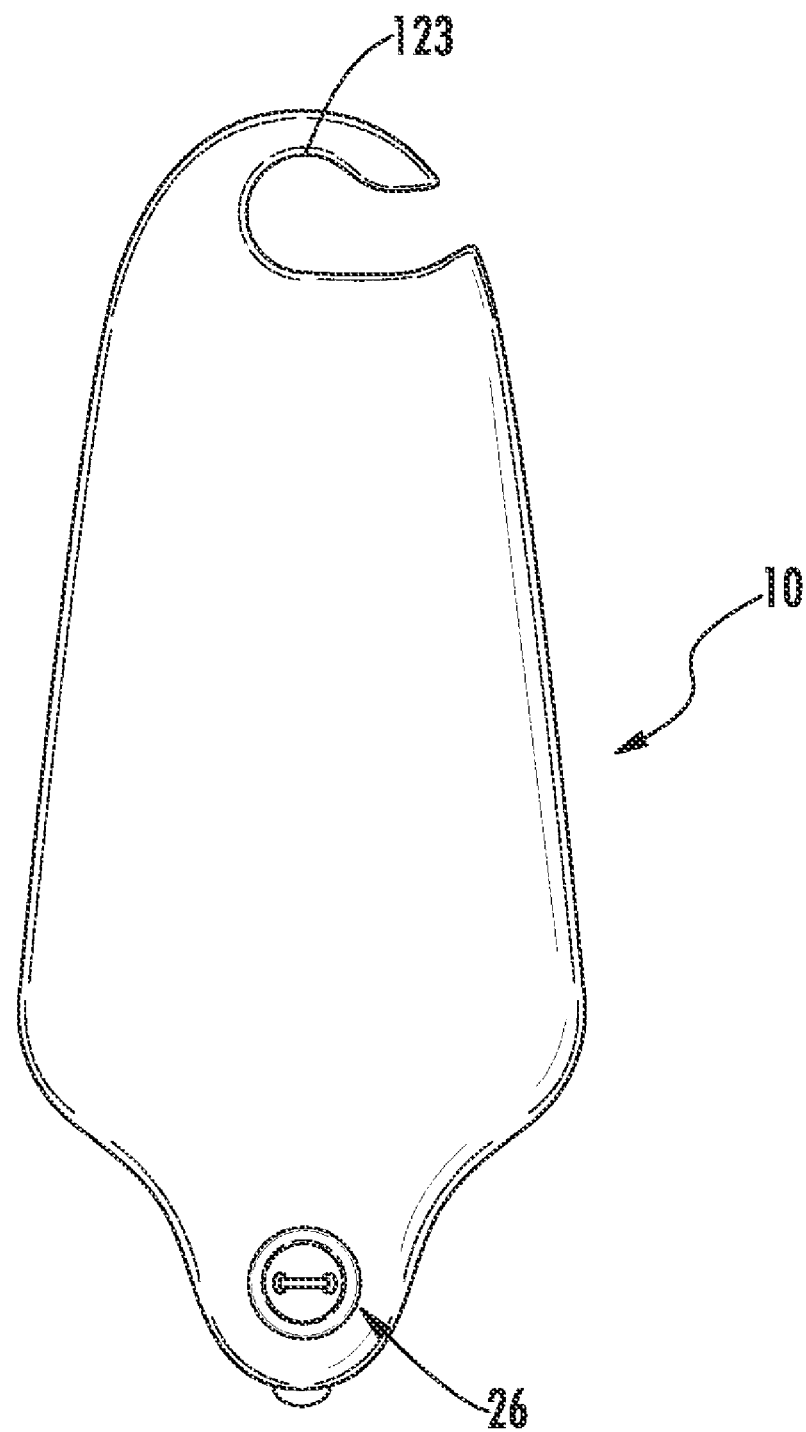
FIG. 5 is a view of an alternate hanging arrangement.
Figure 6:
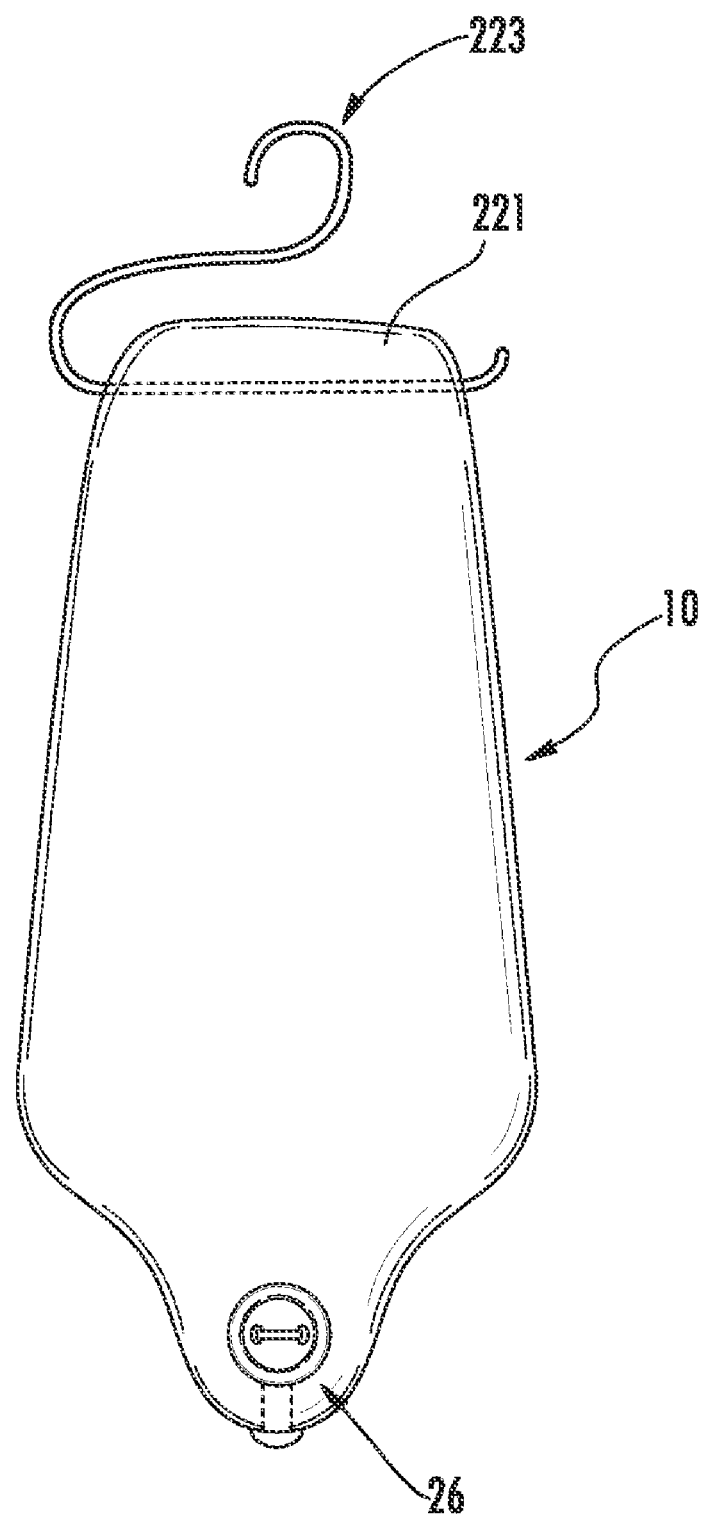
FIG. 6 is a view of a second alternate hanging arrangement.

Turning to FIG. 5, while it should be noted that any type and size of aperture 23 could be provided in the dispenser 10 to effectuate the hanging functionality of the dispenser 10. An alternate hanging structure is depicted in the form of a hook 123 formed integrally in the top of the dispenser 10. To facilitate using the hook 123 in this manner, reinforcing material may be added to the walls 21 of the dispenser 10 as they are assembled. In addition, FIG. 6 depicts the use of an accessory hook 223 that is inserted into a channel 221 formed along the rear of the dispenser 10 to facilitate hanging. In fact, while some different possible embodiments are depicted herein, any type of hanger, eye or hook can be incorporated into the package to carry out the ability for the packaging to be easily hung to a support. For example, additional hanger structures may include a rope, suction cup, Velcro strap, and the like.

Figure 7:
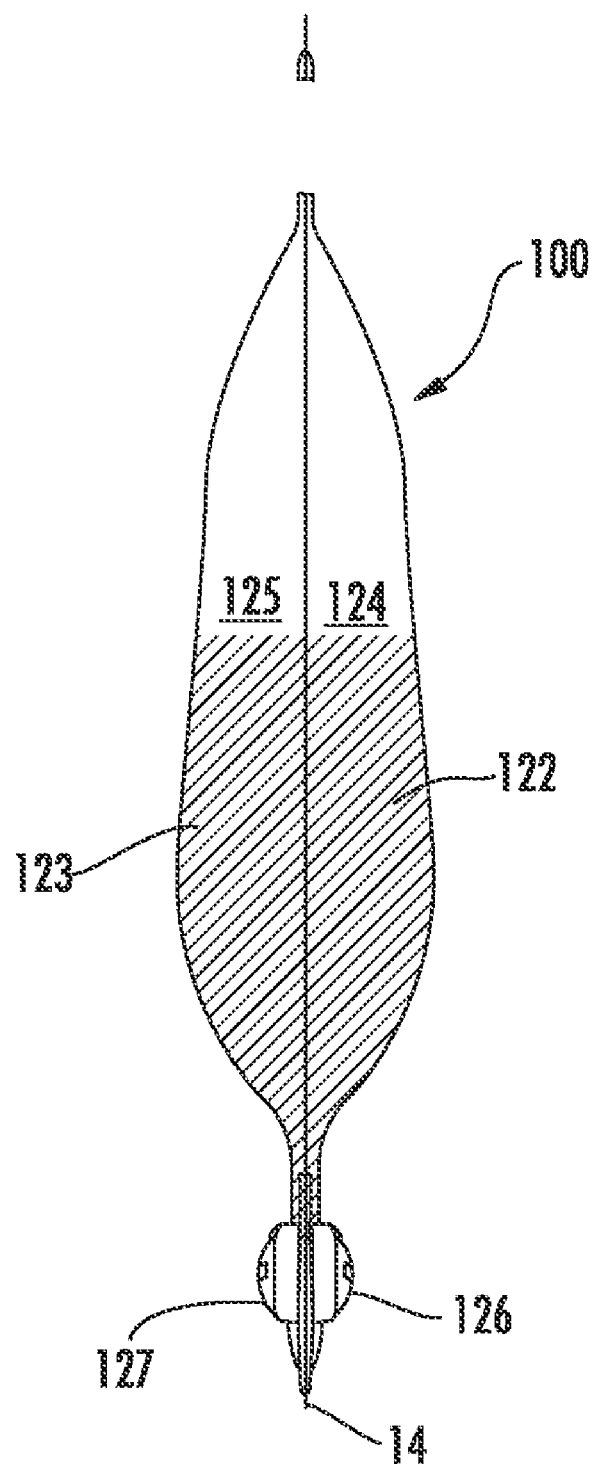
FIG. 7 is a cross-sectional view of a dual reservoir hanging dispensing device.

Turning to FIG. 7, an alternate embodiment dispenser 100 is depicted that includes two fluid storage reservoirs 122, 123 therein. The first fluid reservoir 122 contains a first fluid 124 and a second fluid reservoir 123 containing a second fluid 125. A first metered dosing pump 126 is provided in fluid communication with the first fluid reservoir 122 and is operable to transfer a portion of the first fluid 124 from the first fluid reservoir 122 to an output port 14. A second metered dosing pump 127 is provided in fluid communication with the second fluid reservoir 123 and is also operable to transfer a portion of the second fluid 125 from the second fluid reservoir 123 to the output port 14. In operation, the first and second metering pumps 126, 127 operate as described above but may be arranged in back-to-back or nested to allow simultaneous operation and dispensing of fluids 124, 125. In this embodiment, the dispenser 100 can simultaneously dispense the fluid within the multiple fluid storage regions. Further, in such an arrangement, the multiple fluid storage regions may each contain the same or different liquids and there may be more than to fluid storage regions, each having a corresponding metering pump. Also, the dosing and the volumes of the pumps on each of the respective chambers can be adjusted to the suit the liquid being dispensed and the desired mixing thereof.

In summary, this invention offers many advantages over the prior art by allowing the user flexibility in hanging a fluid dispenser in a convenient manner that allows the user to operate the dispenser with a single hand while dispensing fluid into the free hand. Further, the dispenser can remain in its installed hanging position to for storage and easily accessible use.

It would be appreciated by those skilled in the art that various changes and modifications can be made to the illustrated embodiments without departing from the spirit of the present invention. All such modifications and changes are intended to be covered by the appended claims.

What is claimed:

1. A fluid dispensing device, comprising:
a main body having a fluid reservoir, a top and a bottom, the main body comprising at least two film layers, the film layers being at least partially sealed to one another along their edges;

an aperture formed in the film layers at the top of the main body for hanging the fluid dispensing device;
a metered dispensing pump attached to the bottom of the main body;
the metered dispensing pump comprising;
a hollow flexible button having a top portion and a bottom portion;
a base plate having an intake port attached to the bottom portion of the hollow flexible button, wherein the base plate is manipulatable between at least two positions and the base plate and the hollow flexible button form an inner cavity;
a flapper valve positioned over the intake port;
the hollow flexible button distortable from a first position to a second position and automatically returnable substantially to the first position;
the hollow flexible button attached to an exit port;
the intake port being in fluid communication with the fluid reservoir;
the exit port being in fluid communication with an exterior of the fluid reservoir;
the metered dispensing pump being configured to draw fluid from the fluid reservoir through the intake port and into the inner cavity when the hollow flexible button is returned from the second position to the first position; and
the metered dispensing pump being further configured to urge fluid from the inner cavity through the exit port when the hollow flexible button is distorted from the first position to the second position.

2. The fluid dispensing device of claim 1 wherein the fluid dispensing device further includes a hook extending through the aperture in the main body.

3. The fluid dispensing device of claim 1, further comprising:
at least one additional fluid reservoir formed within the main body; and
at least one additional corresponding metered dispensing pump in fluid communication with the at least one additional fluid reservoir.

4. The fluid dispensing device of claim 3, wherein the fluid in each of the fluid reservoirs is the same type of fluid.

5. The fluid dispensing device of claim 3, wherein the fluid in each of the fluid reservoirs is a different type of fluid.

6. The fluid dispensing device of claim 5, wherein each of the dispensing pumps is in fluid communication with an exit pathway and the fluid output is mixed as it passes through the exit pathway.

7. The fluid dispensing device of claim 3, wherein the plurality of metered dispensing pumps are positioned adjacent to one another such that a user depresses them simultaneously.

8. The fluid dispensing device of claim 1 wherein the hollow flexible button is shaped like a dome.

9. The fluid dispensing device of claim 3, wherein at least two of the fluid reservoirs contain the same type of fluid.

10. The fluid dispensing device of claim 1, wherein the flapper valve is biased toward an open condition.

11. The fluid dispensing device of claim 1, wherein the flapper valve is biased toward a closed condition.

12. The fluid dispensing device of claim 1, wherein the at least two positions between which the base plate is manipulatable include a convex position and a concave position.

13. The fluid dispensing device of claim 12, wherein the base plate is biased toward the convex position.

14. A fluid dispensing device, comprising:
a flexible main body having a plurality of fluid reservoirs and a top and a bottom, the main body comprising at least two film layers, the film layers being at least partially sealed to one another along their edges;
an aperture formed in the film layers at the top of the flexible main body for hanging the fluid dispensing device;
a metered dispensing pump attached to each of the plurality of fluid reservoirs;
each metered dispensing pump comprising;
a hollow flexible button shaped like a dome having a top portion and a bottom portion;
a base plate having an intake port attached to the bottom portion of the hollow flexible button, wherein the base plate is manipulatable between at least two positions and the base plate and the hollow flexible button form an inner cavity;
a flapper valve positioned over the intake port;
the hollow flexible button distortable from a first position to a second position and automatically returnable substantially to the first position;
the hollow flexible button attached to an exit port;
the intake port being in fluid communication with the fluid reservoir;
the exit port being in fluid communication with an exterior of the fluid reservoir;
the metered dispensing pump being configured to draw fluid from the fluid reservoir through the intake port and into the inner cavity when the hollow flexible button is returned from the second position to the first position; and
the metered dispensing pump being further configured to urge fluid from the inner cavity through the exit port when the hollow flexible button is distorted from the first position to the second position.

15. The fluid dispensing device of claim 14 wherein the fluid dispensing device further includes a hook extending through the aperture in the main body.

16. The fluid dispensing device of claim 14, wherein the fluid in each of the plurality of fluid reservoirs is the same type of fluid.

17. The fluid dispensing device of claim 14, wherein the fluid in each of the fluid reservoirs is a different type of fluid.

18. The fluid dispensing device of claim 14, wherein at least two of the plurality of fluid reservoirs contains the same type of fluid.

19. The fluid dispensing device of claim 14, wherein each metered dispensing pump is in fluid communication with an exit pathway and the fluid output is mixed as it passes through the exit pathway.

20. The fluid dispensing device of claim 14, wherein the fluid dispensing device has two metered dispensing pumps and the hollow flexible button of each metered dispensing pump has a central axis extending from the top portion to the bottom portion, wherein the top portion of said hollow flexible buttons face away from each other and said central axes are positioned substantially co-axial to one another such that they can be simultaneously pinched between two fingers and as such actuated simultaneously.

21. The fluid dispensing device of claim 14, wherein the at least two positions between which the base plate is manipulatable include a convex position and a concave position.

22. The fluid dispensing device of claim 21, wherein the base plate is biased toward the convex position.

* * * * *